US010381315B2

United States Patent
Simka et al.

(10) Patent No.: US 10,381,315 B2
(45) Date of Patent: Aug. 13, 2019

(54) METHOD AND SYSTEM FOR PROVIDING A REVERSE-ENGINEERING RESISTANT HARDWARE EMBEDDED SECURITY MODULE

(71) Applicant: Samsung Electronics Co., Ltd., Gyeonggi-do (KR)

(72) Inventors: Harsono S. Simka, Saratoga, CA (US); Ganesh Hegde, Austin, TX (US); Joon Goo Hong, Austin, TX (US); Rwik Sengupta, Austin, TX (US); Mark S. Rodder, Dallas, TX (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/927,239

(22) Filed: Mar. 21, 2018

(65) Prior Publication Data

US 2019/0148312 A1 May 16, 2019

Related U.S. Application Data

(60) Provisional application No. 62/587,357, filed on Nov. 16, 2017.

(51) Int. Cl.
*H01L 31/062* (2012.01)
*H01L 23/00* (2006.01)
(Continued)

(52) U.S. Cl.
CPC ........ *H01L 23/573* (2013.01); *H01L 23/5228* (2013.01); *H01L 27/0207* (2013.01);
(Continued)

(58) Field of Classification Search
CPC . H01L 27/0207; H01L 23/525; H01L 23/528; H01L 2924/04953;
(Continued)

(56) References Cited

U.S. PATENT DOCUMENTS 6,491,978 B1 12/2002 Kalyanam
6,528,865 B1 3/2003 Vajana
(Continued)

OTHER PUBLICATIONS

Dr. Sergi Skorobogatov, "Hardware Security of Silicon Chips", Provable Security against Physical Attacks: Hardware Security, Feb. 15-19, 2010. http://www.cl.cam.ac.uk/~sps32/lorentz_2010.pdf.
(Continued)

*Primary Examiner* — Hsien Ming Lee
(74) *Attorney, Agent, or Firm* — Van Pelt, Yi & James LLP

(57) ABSTRACT

A hardware-embedded security system is described. The system includes connective components, circuit elements and an insulator. The connective components include a variable conductivity layer that is conductive for a first stoichiometry and insulating for a second stoichiometry. The variable conductivity layer is conductive for a first portion of the connective components connected to a first portion of the circuit elements. The variable conductivity layer is insulating for a second portion of the connective components connected to a second portion of the circuit elements. Thus, the first portion of the circuit elements are active and the second portion of the circuit elements are inactive. The insulator is adjacent to at least a portion of each of the connective components. The first stoichiometry may be indistinguishable from the second stoichiometry via optical imaging and electron imaging of a portion of the insulator and the variable conductivity layer.

20 Claims, 3 Drawing Sheets

(51) Int. Cl.
*H01L 23/522* (2006.01)
*H01L 27/02* (2006.01)
*H04L 9/32* (2006.01)
*H01L 23/532* (2006.01)

(52) U.S. Cl.
CPC ...... *H04L 9/3278* (2013.01); *H01L 23/53209* (2013.01); *H01L 23/53214* (2013.01); *H01L 23/53228* (2013.01); *H01L 23/53242* (2013.01); *H01L 23/53257* (2013.01)

(58) Field of Classification Search
CPC ....... H01L 2924/01073; H01L 29/2003; H01L 33/0075; H01L 33/007; G11C 5/063
See application file for complete search history.

(56) References Cited

U.S. PATENT DOCUMENTS

| | | | |
|---|---|---|---|
| 6,706,115 B2 | 3/2004 | Leskela | |
| 6,743,473 B1 | 6/2004 | Parkhe | |
| 6,924,552 B2 | 8/2005 | Baukus | |
| 7,166,515 B2 | 1/2007 | Clark | |
| 7,843,062 B2 | 11/2010 | Chen | |
| 7,867,889 B2 | 1/2011 | Besling | |
| 7,928,006 B2 | 4/2011 | Besling | |
| 8,659,124 B2 | 2/2014 | Roest | |
| 9,171,810 B2 | 10/2015 | in't Zandt | |
| 9,391,014 B2 | 7/2016 | Feng | |
| 9,735,103 B1 | 8/2017 | Yang | |
| 9,793,207 B1 | 10/2017 | Yang | |
| 2016/0377830 A1* | 12/2016 | Zohrabyan | G02B 7/38 349/33 |
| 2017/0263574 A1 | 9/2017 | Cooney | |
| 2017/0263575 A1 | 9/2017 | Cao | |

OTHER PUBLICATIONS

Richard Newell, "The Biggest Security Threats Facing Embedded Designers", ElectronicDesign, May 23, 2016 http://www.electronicdesign.com/iot/biggest-security-threats-facing-embedded-designers.

* cited by examiner

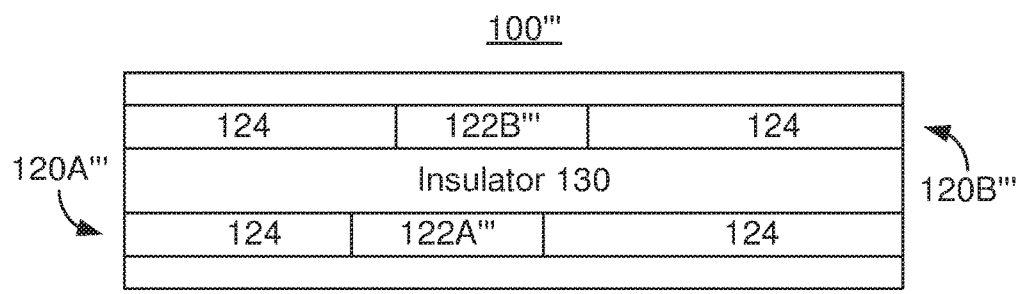
FIG. 4
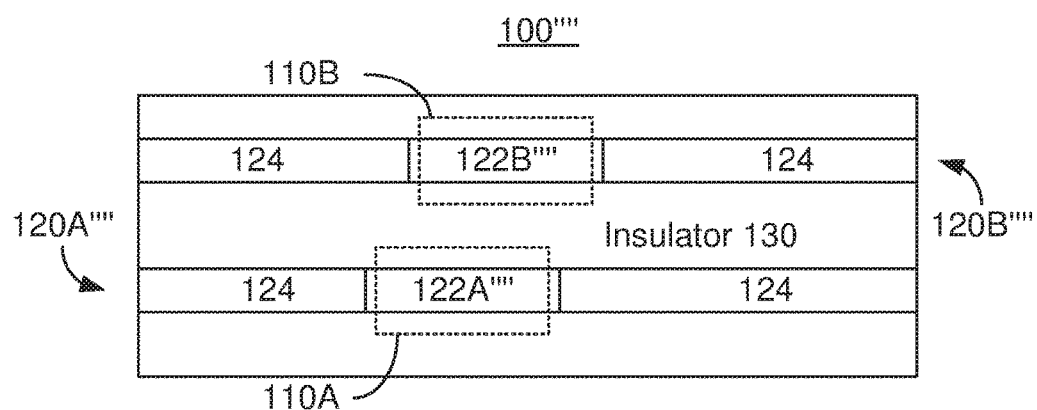
FIG. 5
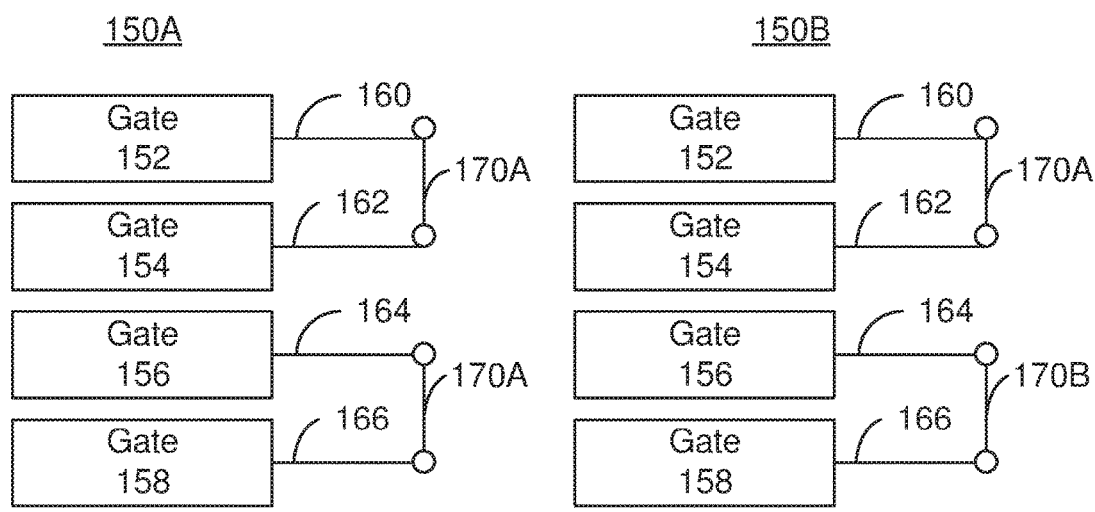
FIG. 6A
FIG. 6B

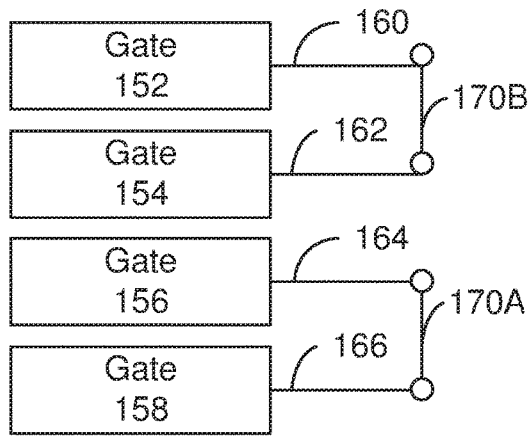
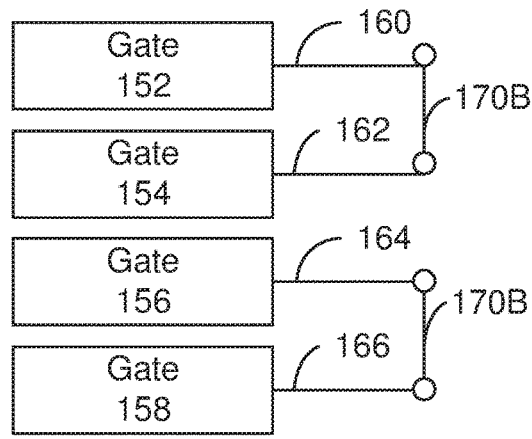
FIG. 6C
FIG. 6D
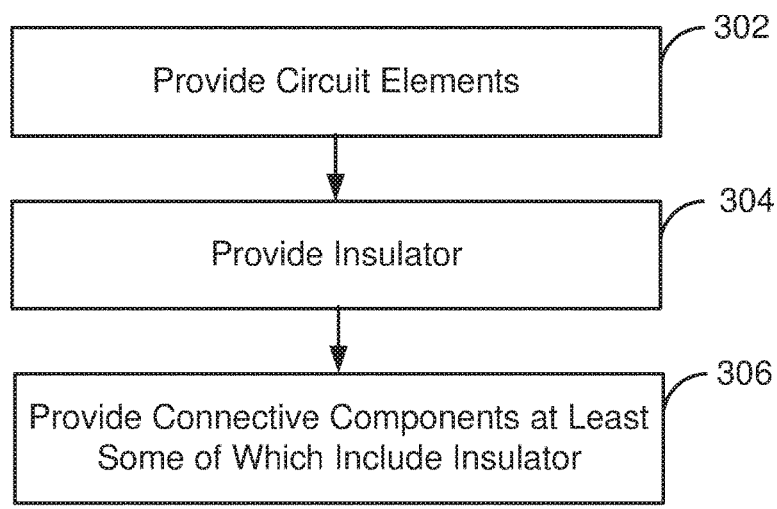
FIG. 7

METHOD AND SYSTEM FOR PROVIDING A REVERSE-ENGINEERING RESISTANT HARDWARE EMBEDDED SECURITY MODULE

CROSS-REFERENCE TO RELATED APPLICATIONS

This application claims the benefit of provisional Patent Application Ser. No. 62/587,357, filed Nov. 16, 2017, entitled A REVERSE-ENGINEERING RESISTANT HARDWARE IMPLEMENTATION OF PHYSICALLY UNCLONABLE FUNCTION (PUF) CIRCUIT, ON-CHIP HIDDEN SECRET KEYS, AND IDENTITY CREDENTIALS USING TANTALUM NITRIDE BASED INTERCONNECT MATERIALS", assigned to the assignee of the present application, and incorporated herein by reference.

BACKGROUND

Robust hardware-based security solutions have become increasingly important for a vast array of computing devices and applications. Security modules may limit access to information to prevent IP piracy, identity theft, theft of service and cloning of devices. Many common security protocols use keys, which can be stored in hardware as a set of charges in non-volatile memory (NVM) cells. More recently, circuits that implement physically unclonable functions (PUFs) have been employed to generate unique signatures that can be used for authentication. Conventional hardware-embedded security modules rely on components such as switches and/or gates for protection. Security is maintained by keeping these components hidden, either by dispersing them to various locations in the die or by hiding them among dummy gates. Consequently, some measure of resistance to discovery may be provided.

Although hardware-embedded security is functional, it has become less secure due to advances in techniques used to reverse engineer devices. Reverse engineering utilizes the same process tools that are used in the state-of-the-art semiconductor fabrication. For example, chemical mechanical planarization (CMP) steps, wet etches, dry etches, optical imaging, and electron imaging such as cross-sectional scanning electron microscopy (SEM) and transmission electron microscopy (TEM) may be used to reverse engineer a device. As a result, these process tools can be used to uncover the structure and function of components of conventional hardware embedded security modules. For example, interconnect wiring (which includes trenches and vias) can often be imaged layer by layer, after polish/CMP steps, to extract the interconnection between the relevant gates responsible for setting the key. Thus, dummy gates used for camouflage may be differentiated from active gates used for the key. The knowledge of the interconnections can expose the key directly or provide a manageable set of targets to further focus the imaging or electrical probing to discover the key. The local interconnects can also provide a unique identifying mark for the locations of relevant gates for the security key. A search can then be done by data-mining the structures seen by the images taken layer by layer. Each interconnect "pattern" can be thought of representing a unique logic combination involving the gates underneath because each wire or via represents a good, active electrical connection.

Thus, current hardware-based security technologies may take the form of hardware keys programmed or stored as charges in one of the various forms of nonvolatile memory, and circuits with hidden or camouflaged gates that implement a PUF. These technologies are susceptible to various tampering attacks, for example, passive side channel attacks such as differential power analysis and electromagnetic analysis. Despite some countermeasures, these technologies may also be defeated by dedicated reverse engineering efforts if the attackers gain physical access to the device, since the gates comprising the hardware keys can be identified and probed. Accordingly, what is desired is an improved mechanism for implementing hardware-based security.

BRIEF SUMMARY OF THE INVENTION

A hardware-based security system is described. The system includes connective components, circuit elements coupled to the connective components and an insulator. The connective components include a variable conductivity layer. The variable conductivity layer is conductive for a first stoichiometry and insulating, i.e. sufficiently non-conductive as desired, for a second stoichiometry. The first and second stoichiometries include the same elements. The variable conductivity layer is conductive for a first portion of the plurality of connective components and insulating for a second portion of the plurality of connective components. The first portion of the connective components is connected to a first portion of the circuit elements. The second portion of the connective components is connected to a second portion of the circuit elements. Thus, the first portion of the circuit elements are active while the second portion of the circuit elements are inactive. The insulator is adjacent to at least a portion of each of the connective components. The first stoichiometry may be indistinguishable from the second stoichiometry via optical imaging and electron imaging of a portion of the system including the insulator and the variable conductivity layer.

The hardware security system uses the variable conductivity layer to camouflage the circuit elements that are active. Because the differences in stoichiometry between the conducting and insulating phases is not imageable, the hardware security system better resists reverse engineering. Performance of the security system may thus be improved.

BRIEF DESCRIPTION OF SEVERAL VIEWS OF THE DRAWINGS

FIGS. 1-5 are diagrams depicting exemplary embodiments of portions of hardware-embedded security modules using components having varying stoichiometry and conductivity.

FIGS. 6A-6D are diagrams depicting hardware-embedded security modules that store a key using components having varying stoichiometry and conductivity.

FIG. 7 is a flow chart depicting an exemplary embodiment of a method for providing hardware-embedded security modules using components having varying stoichiometry and conductivity.

DETAILED DESCRIPTION OF THE INVENTION

Figure 1:
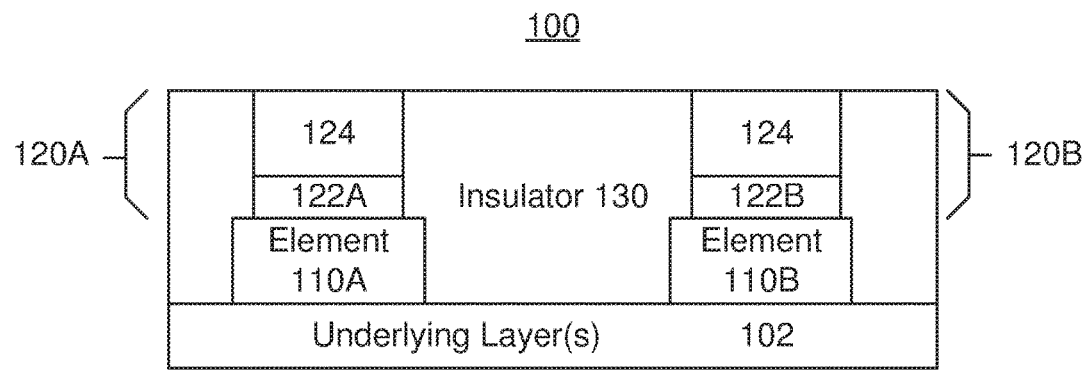

The exemplary embodiments relate to hardware-embedded security. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations.

Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or fewer components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

A hardware-based security system is described. The system includes connective components, circuit elements coupled to the connective components and an insulator. The connective components include a variable conductivity layer. The variable conductivity layer is conductive for a first stoichiometry and insulating for a second stoichiometry. The variable conductivity layer is conductive for a first portion of the plurality of connective components and insulating for a second portion of the plurality of connective components. The first and second stoichiometries may include the same elements, but in different fractions. The first portion of the connective components is connected to a first portion of the circuit elements. The second portion of the connective components is connected to a second portion of the circuit elements. Thus, the first portion of the circuit elements are active while the second portion of the circuit elements are inactive. The insulator is adjacent to at least a portion of each of the connective components. The first stoichiometry may be indistinguishable from the second stoichiometry via optical imaging and electron imaging of a portion of the system including the insulator and the variable conductivity layer.

FIGS. 1-5 are diagrams depicting exemplary embodiments portions of hardware-embedded security systems 100, 100', 100", 100''' and 100'''' using components having varying stoichiometry and conductivity. For simplicity, not all structures are shown in FIGS. 1-5. Substructures that are not depicted may be present in the structures shown. FIGS. 1-5 are not to scale. Further, although single components are shown, one of ordinary skill in the art will recognize that multiple components are generally present.

Referring to FIG. 1, the security system 100 includes circuit elements 110A and 110B, connective components 120A and 120B and insulator 130 formed on underlying layers 102. The underlying layers 102 may include various structures. The circuit elements 110A and 110B are used in providing security for the devices with which the system 100 is used. For example, the circuit elements 110A and 110B may be nonvolatile memory cells used in passively storing values of a key. In another embodiment, the circuit elements 110A and 110B might be gates or other active elements used in a PUF or other cryptographic encoder circuit. In other embodiments, the circuit elements 110A and 110B might be other active or passive components used in security and/or for which camouflage is otherwise desired.

Connective components 120A and 120B (collectively 120) include a variable conductivity layer 122A and 122B (collectively 122), respectively, and a high conductivity layer 124. The connective components 120 may be interconnect wiring, interconnect vias, metal gates or other structures that are generally used to conduct current. In the embodiment shown, the connective components 120 may be interconnects. The high conductivity layer 124 may include materials such as Cu, Al, Co, W, silicides and/or Ru. Although generally desired to be the same in both connective components 120, nothing prevents the high conductivity layer 124 from including different materials for different connective components 120A and 120B. In an alternate embodiment, the layer 124 may be omitted. In such embodiments, electrical conduction through the connective components 120 may be primarily through the variable conductivity layer 122A and 122B. Because variable conductivity layers 122 generally have a lower conductivity than materials such as Cu, Al, Co, W, silicides and/or Ru, inclusion of the layers 124 is generally desired. Other layers (not shown) may be present in the connective components 120.

In the embodiment shown, the variable conductivity layers 122A and 122B are below the high conductivity layer 124. However, in other embodiments, the variable conductivity layers 122A and/or 122B may also reside on the sides of the high conductivity layer 124. In other alternate embodiments, the variable conductivity layers may be within the high conductivity layer 124 or on top of the high conductivity layer 124. The variable conductivity layers 122A and 122B are generally desired to be thin. For example, each of the variable conductivity layers 122A and 122B may have a thickness that is at least one nanometer and not more than five nanometers. In some such embodiments, each of the variable conductivity layers 122 is not more than two nanometers thick.

The variable conductivity layer 122A is conductive, while the variable conductivity layer 122B is insulating, i.e. sufficiently non-conductive as desired. Stated differently, variable conductivity layer 122A has a sufficiently low resistance for the desired component, element 110A, to be used. Thus, the variable conductivity layer 122A has a resistance that allows electrical connection to the element 110A. In contrast, variable conductivity layer 122B has a sufficiently high resistance that the desired component, element 110B is rendered inoperable. For example, sufficient electrical connection may not be made to the element 110B through the variable conductivity layer 122B. However, variable conductivity layers 122A and 122B may be indistinguishable via optical or electron (SEM or TEM) imaging of the connective components 120 and the surrounding region, such as the insulator 130. The variable conductivity layers 122A and 122B may be formed of the same elements, but have different stoichiometries. This aids in rendering the layers 122A and 122B indistinguishable via optical or electron imaging. However, because of the difference in stoichiometries, the variable conductivity layers 122A and 122B have different electrical properties. Thus, the variable conductivity layer 122A is conductive, while the variable conductivity layer 122B insulating. For example, the variable conductive layers 122 may include a $Ta_yN_x$ layer, a $Ti_yN_x$ layer, a $W_yN_x$ layer, a $Hf_yN_x$ layer, a $Zr_yN_x$ layer and/or a $Mo_yN_x$ layer, where x and y indicate a varying stoichiometry. For such materials, the nitrogen rich phase is generally insulating, while the nitrogen poor/metal rich phase is usually conductive. For example, a review of the band structure of $Ta_yN_x$ indicates that $Ta_3N_5$ is insulating, while $Ta_2N$ and TaN are conductive. Thus, the variable conductivity layer 122A may include $Ta_2N$ and/or TaN. In contrast, the variable conductivity layer 122B may include $Ta_3N_5$.

The connective component 122A provides electrical connection to the circuit element 110A. This is because both constituents 122A and 124 of the connective component 122A are conductive. As a result, the element 110A can be considered to be active, or switched on. In contrast, the insulating nature of variable conductivity layer 122B isolates, i.e. sufficiently isolates as desired, the high conductivity layer 124 from the circuit element 110B. Consequently, the circuit element 110B is electrically isolated from (though physically connected to) the connective component 122B. Thus, the circuit element 110B can be considered to be inactive, or switched off.

Use of the hardware security system 100, particularly in connection with other security mechanisms such as dummy gates, improves the ability of a device to withstand investigation. For example, the connective component 120A may be coupled to a memory cell (e.g. element 110A is a memory cell) that stores a portion of the key, while the connective component 120B is coupled to a dummy memory cell. Similarly, the connective component 120A may be coupled to a gate used in operation of a PUF, while the connective component 120B is coupled to a gate that is not used. In such an embodiment, element 110A may include the used gate, while element 110B may include the unused gate. The elements 110A that are used are electrically connected by connective components 120A, while the elements that are unused are sufficiently disconnected via components 120B. The layers 122A and 122B are indistinguishable via current optical and electron imaging techniques. Consequently, an entity attempting to reverse engineer the device 100 is unable to determine which of the circuit elements 110A and/or 110B (or neither) is connected. Thus, each security module 100 may include a number of memory cells, gates or other circuit elements 110 which appear to have the same electrical connection to interconnects 120 because they are physically connected, but which have a unique function or electrical connection. Stated differently, the use of the connective components 120 having variable conductive layers 122 may better camouflage the circuit elements 110A that are active.

Thus, use of the connective components 120 improves security by allowing circuit elements to be connected/open while enhancing resistance to reverse engineering. This improvement may be achieved without requiring additional gates or memory cells. The connective components 120 may also be formed in regions where layout density is low. Thus, additional area need not be consumed. Further, longer keys may be enabled by increasing the permutation of connectivity in interconnect networks using the variable conductivity layers 122. Thus, the mechanism is scalable. Multiple instances of connective components 120 may be provided. Thus, the connections 120 may provide the desired randomization in circuit elements 110 that are active in providing security. Memory cells and/or gates used in providing security may not need to be hidden. Moreover, the processes and materials used in forming the connective components 120 and variable conductivity layers 122 are known. Consequently, fabrication of a device employing the security system 100 may not be significantly complicated. Thus, use of the hardware security module 100 improves performance.

Figure 2:
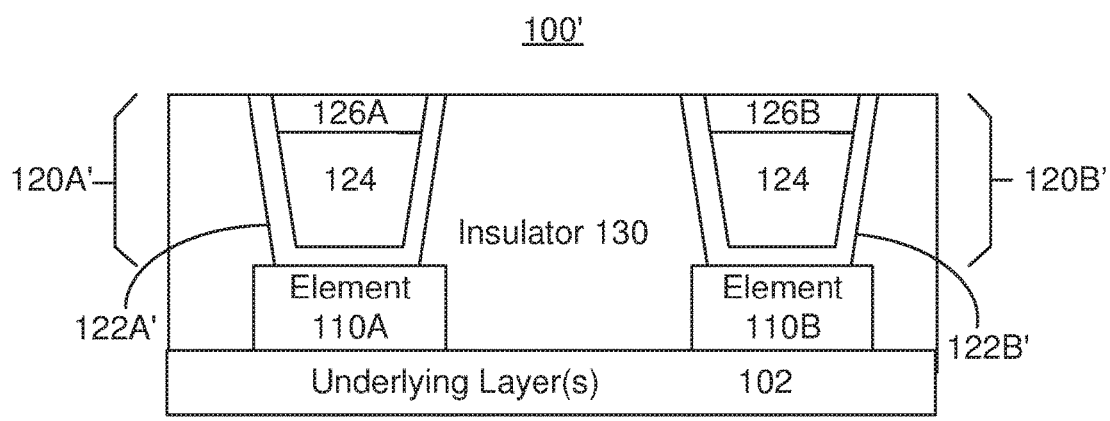

FIG. 2 depicts a security system 100' analogous to the security system 100 depicted in FIG. 1. Analogous components have similar labels. Thus, the security system 100' includes circuit elements 110A and 110B, connective components 120A' and 120B' and insulator 130 on underlying layers 102 which are analogous to circuit elements 110A and 110B, connective components 120A and 120B, insulator 130 and underlying layers 102, respectively. The circuit elements 110A and 110B are used in providing security for the devices with which the system 100' is used and may include non-volatile memory cells, gates and/or other active or passive elements.

The connective components 120A' and 120B' (collectively 120') may be vias or interconnects including variable conductivity layers 122A' and 122B' (collectively 122') and high conductivity layer 124. The structure and function of layers 122A', 122B' and 124 are analogous to those of 122A, 122B and 124, respectively. Thus, the variable conductivity layers 122A' and 122B' may be formed of the same elements but with different stoichiometries that result in different conductivities. For example, the variable conductivity layer 122A' may be conductive, while the variable conductivity layer 122B' may be insulating. In addition, instead of simply lying along one side of the high conductivity layer 124, the variable conductivity layers 122A' and 122B' surround multiple sides of the high conductivity layer 124. In an alternate embodiment, the variable conductivity layers 122A' and 122B' may be only at the bottom of the components 120A' and 120B', respectively.

Also shown are optional variable layers 126A and 126B (collectively 126). The structure and function of variable conductivity layers 126 is analogous to that of layers 122 and 122'. Thus, one or both of the variable conductivity layers 126 may be conductive or insulating, but may be formed of the same elements, have different stoichiometries, and may be indistinguishable by optical and electron imaging. Thus, the connection to circuit elements 110A and 110B may be varied not only by the layers 122', but also by the layers 126. For example, there may be additional components (not shown) formed above the vias 120' the connection to which is desired to be camouflaged. Varying the stoichiometry of the layers 126A and 126B makes this possible. Thus, multiple layers of connection may be individually configured while maintaining resistance to reverse engineering.

The hardware security system 100' shares the benefits of the system 100. The elements that are used are electrically connected by layers 122A' and/or 126A/126B, while the elements that are unused are not connected via layers 122B' and/or 126A/B. Whether or not electrical connection is made may not be determined using reverse engineering because the layers 122A' and 122B' and the layers 126A and 126B are indistinguishable via current optical and electron imaging techniques. The use of the connective components 120' having variable conductive layers 122' and 126 may better camouflage the circuit elements that are active. This improvement in security are scalable, achieved without requiring additional gates or memory cells, need not use hidden structures and/or may use known processes and materials. Consequently, use of the hardware security module 100' improves performance.

Figure 3:
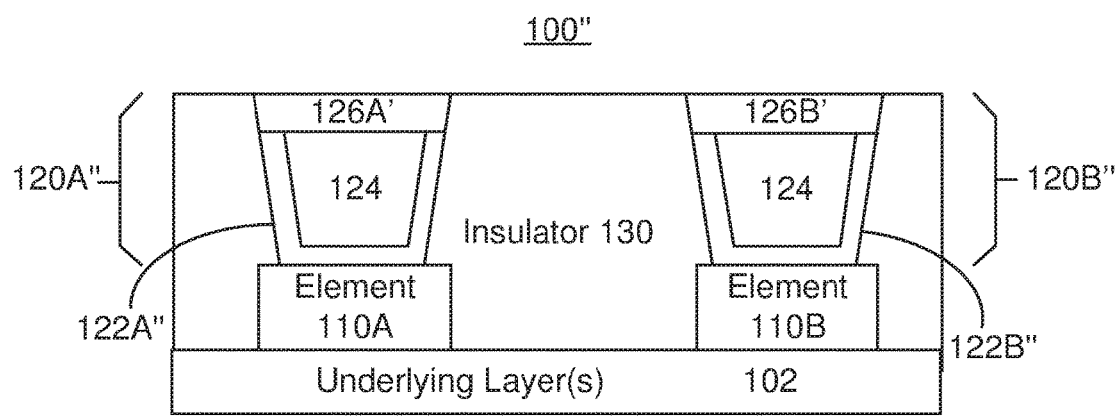

FIG. 3 depicts a security system 100" analogous to the security system 100 and 100' depicted in FIGS. 1-2. Analogous components have similar labels. Thus, the security system 100" includes circuit elements 110A and 110B, connective components 120A" and 120B" and insulator 130 on underlying layers 102 which are analogous to circuit elements 110A and 110B, connective components 120A/120A' and 120B/120B', insulator 130 and underlying layers 102, respectively. The circuit elements 110A and 110B are used in providing security for the devices with which the system 100" is used and may include nonvolatile memory cells, gates and/or other active or passive elements.

The connective components 120A" and 120B" (collectively 120") are particularly analogous to the connective components 120A' and 120B' depicted in FIG. 2. The structure and function of layers 122A", 122B" and 124 are analogous to those of 122A/122A', 122B/122B' and 124, respectively. Thus, the variable conductivity layers 122A" and 122B" may be formed of the same elements but with different stoichiometries that result in different conductivities. For example, the variable conductivity layer 122A" may be conductive, while the variable conductivity layer 122B" may be insulating. In addition, instead of simply lying along one side of the high conductivity layer 124, the variable conductivity layers 122A" and 122B" surround multiple sides of the high conductivity layer 124.

Also shown are optional variable layers 126A' and 126B' (collectively 126'). The structure and function of variable conductivity layers 126' is analogous to that of layers 122 and 122'. Thus, one or both of the variable conductivity layers 126' may be conductive or insulating, but may be formed of the same elements, have different stoichiometries, and may be indistinguishable by optical and electron imaging. Thus, the connection to circuit elements 110A and 110B may be varied not only by the layers 122", but also by the layers 126'. For example, there may be additional components (not shown) formed above the vias 120" the connection to which is desired to be camouflaged. Varying the stoichiometry of the layers 126A' and 126B' makes this possible. Thus, multiple layers of connection may be individually configured while maintaining resistance to reverse engineering. In addition, layers 126A' and 126B' are completely above 122A" and 122B". Hence, current may not be conducted through the sidewalls of 122A" or 122B"/126A' or 126B' if these layers are insulating.

The hardware security system 100" shares the benefits of the system 100 and 100'. The elements that are used are electrically connected by layers 122A" and/or 126A/126B, while the elements that are unused are not connected via layers 122B" and/or 126A'/126B'. Whether or not electrical connection is made may not be determined using reverse engineering because the layers 122A" and 122B" and the layers 126A' and 126B' are indistinguishable via current optical and electron imaging techniques. The use of the connective components 120" having variable conductive layers 122' and 126' may better camouflage the circuit elements that are active. This improvement in security may scalable, achieved without requiring additional gates or memory cells, need not use hidden structures and/or may use known processes and materials. Further, if the layers 126' and 122" are insulating, they are less likely to suffer from current leakage. Consequently, use of the hardware security module 100" improves performance.

FIG. 4 depicts a security system 100''' analogous to the security systems 100, 100' and/or 100" depicted in FIGS. 1-3. Analogous components have similar labels. Thus, the security system 100''' includes connective components 120A''' and 120B''' and insulator 130 which are analogous to connective components 120A/120A'/120A" and 120B/120B'/120B" and insulator 130, respectively.

The connective components 120A''' and 120B''' (collectively 120''') may be interconnects including variable conductivity layers 122A''' and 122B''' (collectively 122''') and high conductivity layer 124. The structure and function of layers 122A''', 122B''' and 124 are analogous to those of 122A/122A'/122A", 122B/122B'/122B" and 124, respectively. Thus, the variable conductivity layers 122A''' and 122B''' may be formed of the same elements but with different stoichiometries that result in different conductivities. For example, the variable conductivity layer 122A''' may be conductive, while the variable conductivity layer 122B''' may be insulating. In addition, instead of simply lying along one side of the high conductivity layer 124, the variable conductivity layers 122A''' and 122B''' surround multiple sides of the high conductivity layer 124.

In the embodiment shown, the variable conductivity layers 122A''' and 122B''' do not adjoin a circuit element. Instead, these layers 122''' replace a portion of the high conductivity layer 124. In the embodiment shown, the layer 122A''' is conductive, while the layer 122B''' is insulating. The layers 122A''' and 122B''' are, however, indistinguishable as described above. Thus, the remaining portion of connective components 120B''' is electrically isolated. Consequently, circuit elements connected to the left of the variable conductivity layer 122B''' are isolated from the circuit elements connected to the right of variable conductivity layer 122B'''. However, circuit elements connected to the left of the variable conductivity layer 122A''' are electrically connected to the circuit elements coupled to the right of variable conductivity layer 122A'''.

The hardware security system 100''' shares the benefits of the systems 100, 100' and/or 100". The use of the connective components 120''' having variable conductive layers 122''' may better camouflage the circuit elements that are active. This improvement in security may scalable, achieved without requiring additional gates or memory cells, need not use hidden structures and/or may use known processes and materials. Consequently, use of the hardware security module 100" improves performance.

FIG. 5 depicts a plan view of a security system 100'''' analogous to the security systems 100, 100', 100" and/or 100''' depicted in FIGS. 1-4. Analogous components have similar labels. Thus, the security system 100'''' includes circuit elements 110A and 110B, connective components 120A'''' and 120B'''' and insulator 130 which are analogous to circuit elements 110A and 110B, connective components 120A/120A'/120A"/120A''' and 120B/120B'/120B"/120B''' and insulator 130, respectively. The circuit elements 110A and 110B are used in providing security for the devices with which the system 100'''' is used and may include nonvolatile memory cells, gates and/or other active or passive elements. The circuit elements 110A and 110B are shown by dashed lines because these elements 110 lie below the layers depicted by the solid line. Although not shown, the high conductivity layer 124 may reside on top of the layers 122A"" and 122B°"' and/or to the sides of the layers 122A"" and/or 122B"".

The connective components 120A"" and 120B"" (collectively 120"") may be interconnects including variable conductivity layers 122A"" and 122B"" (collectively 122"") and high conductivity layer 124. The structure and function of layers 122A"", 122B"" and 124 are analogous to those of 122A/122A'/122A"/122A'", 122B/122B'/122B"/122B'" and 124, respectively. Thus, the variable conductivity layers 122A"" and 122B"" may be formed of the same elements but with different stoichiometries that result in different conductivities. For example, the variable conductivity layer 122A"" may be conductive, while the variable conductivity layer 122B"" may be insulating.

In the embodiment shown, the variable conductivity layers 122A"" and 122B"" adjoin a circuit element 110A and 110B, respectively. However, the variable conductivity layers 122A"" and 122B"" do not lie along the entire length of the connective components 120A"" and 120B"", respectively. Instead, the variable conductivity layers 122A"" and 122B"" are only in the region of the circuit elements 110A and 110B.

The hardware security system 100'" shares the benefits of the systems 100, 100', 100" and/or 100'". The use of the connective components 120"" having variable conductive layers 122"" may better camouflage the circuit elements that are active. This improvement in security are scalable, achieved without requiring additional gates or memory cells, need not use hidden structures and/or may use known processes and materials. Consequently, use of the hardware security module 100"" improves performance. Further, although specific implementations are depicted in FIGS. 1-5, one of ordinary skill in the art would recognize that various features may be combined in other embodiments. For example, a particular system might include both interconnects and vias as described herein. In addition, the method and system may be extended to other devices not inconsistent with the description herein.

FIGS. 6A-6D are diagrams depicting hardware-embedded security modules 150A, 150B, 150C and 150D that store a key using components having varying stoichiometry and conductivity. For clarity, only some portions of the systems 150A, 150B, 150C and 150D are shown. Each of the modules 150A, 150B, 150C and 150D includes four gates 152, 154, 156 and 158 each of which is connected by a conductive line 160, 162, 164 and 166, respectively. The conductive lines 160, 162, 164 and 166 may each include a variable conductive layer such as the layers 122A and 122B. However, in the embodiment shown, the variable conductive layers would be conductive for the lines 160, 162, 164 and 166. For example, the variable conductive layers might include TaN.

Also shown in FIGS. 6A-6D are connective components 170A and 170B. The connective components 170A and 170B may be vias and/or interconnects. Connective component 170A is analogous to the components 120A/120A'/ 120A"/120A'"/120A"", while connective component 170B is analogous to the components 120B/120B'120B"/120'"/ 120B"". Thus, the stoichiometry of the variable conductive layer in the connective component 170A is such that the variable conductive layer is conductive. In contrast, the stoichiometry of the variable conductive layer in the connective component 170B is such that the variable conductive layer is insulating. However, the connective components 170A and 170B are indistinguishable as described above.

As can be seen in FIGS. 6A-6D, four different keys may be provided based upon the use of the connectors 170A and 170B. For the security module 150A, gates 152 and 154 and gates 156 and 158 are electrically connected by connective components 170A. For the security module 150B, gates 152 and 154 are electrically connected by connective component 170A, while gates 156 and 158 are isolated by connective component 170B. For the security module 150C, gates 156 and 158 are electrically connected by connective component 170A, while gates 152 and 154 are isolated by connective component 170B. For the security module 150D, none of the gates are electrically connected. Because the conductive components 170A and 170B, the four security modules 150A, 150B, 150C and 150D may be indistinguishable by optical or electron imaging during reverse engineering.

The hardware security systems 150A, 150B, 150C and 150D share the benefits of the systems 100, 100', 100", 100'" and/or 100"". The use of the connective components 170A and 170B having variable conductive layers may better camouflage the gates 152, 154, 156 or 158 that are active. This improvement in security are scalable, achieved without requiring additional gates or memory cells, need not use hidden structures and/or may use known processes and materials. Consequently, use of the hardware security module 150 may improves performance.

FIG. 7 is a flow chart depicting an exemplary embodiment of a method for providing a hardware embedded security system. For simplicity, some steps may be omitted, performed in another order, include substeps and/or combined. The method 300 is also described in the context of the system 100. However, the method 300 may be used in connection with other systems, including but not limited to the device(s) 100', 100", 100'", 100"" and/or 150.

The circuit elements 110A and 110B used in providing security are fabricated, via step 302. Step 302 may include formation of nonvolatile or other memory cells such as SRAM memory cells, formation of gates and portions of active components, or providing other structures. The circuit elements provided in step 302 are desired to be selectively electrically connected to each other and/or other structures in the device being formed. The insulator 130 is also provided, via step 304.

The connective components 120 are formed, via step 306. Step 306 includes formation of the conductive variable conductivity layers 122A and the insulating variable conductivity layers 122B. The high conductivity layer 124 may also be formed. Step 306 may be performed in a variety of ways. For example, if the deposition is performed using atomic layer deposition (ALD), thermal ALD at low temperatures can be used to deposit the insulating variable conductivity layer 122B, such as $Ta_3N_5$, while plasma enhanced ALD can be used to deposit the conductive variable conductivity layer 122A, such as TaN. Physical vapor deposition (PVD) may be used to deposit $Ta_yN_x$ having variable conductivity and stoichiometry. PVD with a high nitrogen gas flow can lead to insulating or high resistance $Ta_yN_x$ such as $Ta_3N_5$. PVD with low nitrogen gas flow can lead to conductive TaN or $Ta_2N$. For example, the connective components 120 may be formed using two masks. A first mask is provided on the interlayer dielectric with apertures in the regions of the connective components 120A. The insulator 130 is etched to form trenches in the locations of the connective components 120A. Then the conductive variable conductivity layer 122A is provided. The layer 124 is deposited on the layer 122A to fill the trench. A planarization may be performed. This process forms the connective components 120A. A second mask is formed on the interlayer dielectric with apertures in the regions for the connective components 120B. The insulator 130 is etched to form trenches in the locations of the connective components 120B. Then the insulating variable conductivity layer 122B is provided. The layer 124 is deposited to fill the trench. A planarization may be performed. This process forms the connective components 120B. Alternatively, an analogous two mask process which forms the connective components 120B first, then the connective components 120A may be used.

In another embodiment, the conductive variable conductivity layer 122A may be blanket deposited. The insulating variable conductivity layer 122B is then deposited. The layer 122B is etched in the desired portions of the conductive connective components 120A. The high conductivity layer 124 may then be deposited. Thus, components 120A and 120B may be formed. Note that conductive components 120B may have an additional conductive variable conductivity layer (not shown in the drawings) between the layer 122B and the circuit element 110B in such an embodiment. However, because of the presence of the layer 122B, electrical connection is still not made to the circuit element 110B.

In another embodiment, the connective components 120 may have different widths. The widths of the trenches or vias in which the connective components 120 are formed can be used to tune the physical vapor deposition (PVD) of the variable conductivity layers 122A and 122B. For example, the insulating variable conductivity layer 122B may be formed in wider trenches or vias. This leads to connected vias or interconnects 120A on the narrower structures, and open vias or interconnects 120B on the wider structures. In some embodiments, a width-selective barrier etch, for example with a non-collimated ion flux, can be used. Such an etch can remove the insulating variable conductivity layer 120B in the wider structures but not in the narrower structures.

In other embodiments, non-copper metallization may be used for the high conductivity layer 124. In such embodiments, a conductive variable conductivity layer 122A, such as $Ta_yN_x$ or $Ti_yN_x$, can be used as a barrier layer for all structures. An extra layer, such as the layers 126A and/or 126B in FIG. 2 may be inserted to provide the desired selective connection. In other embodiments, the variable conductivity layers 122A and 122B may be implemented at the lowest back end of line layers. For example, the non-metallic vias or interconnect processing can be combined with layout coloring. In other embodiments, a dual-damascene (DD) process may be used. Within each DD layer, the variable conductivity layer 122 (e.g. $Ta_yN_x$) is deposited under the via, only. In single damascene (SD) patterning, the variable conductivity layer 122 may be placed under the via only, under the line or trench only, or both under the via and under the line or trench. The SD approach may enable more flexibility in increasing the number of permutations possible for the hardware keys, and/or increasing the degree of camouflaging of the hidden nets of interconnects. Thus, connective components 120A and 120B may be formed. Fabrication of the device may then be completed.

Thus, using the method 300, the hardware security systems 100, 100', 100'', 100''', 100'''', 150 and/or an analogous device may be used. As a result, the advantages of one or more the hardware security systems 100, 100', 100'', 100''', 100'''', 150 and/or analogous device may be achieved.

A method and system for enhancing security systems provided in hardware has been described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

We claim:

1. A hardware-embedded security system comprising:
   a plurality of connective components including a variable conductivity layer, the variable conductivity layer being conductive for a first stoichiometry and being insulating for a second stoichiometry, the variable conductivity layer being conductive for a first portion of the plurality of connective components and being insulating for a second portion of the plurality of connective components, the first stoichiometry consisting of a plurality of elements, the second stoichiometry consisting of the plurality of elements;
   a plurality of circuit elements coupled with the plurality of connective components, the first portion of the plurality of connective components being connected to a first portion of the plurality of circuit elements, the second portion of the plurality of connective components being connected to a second portion of the plurality of circuit elements such that the first portion of the plurality of circuit elements are active and the second portion of the plurality of circuit elements are inactive; and
   an insulator adjacent to at least a portion of each of the plurality of connective components.

2. The hardware-embedded security system of claim 1 wherein the first stoichiometry is indistinguishable from the second stoichiometry via optical imaging and electron imaging of a portion of the insulator and the variable conductivity layer.

3. The hardware-embedded security system of claim 1 wherein the variable conductivity layer includes at least one of a $Ta_yN_x$ layer, a $Ti_yN_x$ layer, a $W_yN_x$ layer, a $Hf_yN_x$ layer, a $Zr_yN_x$ layer and a $Mo_yN_x$, wherein x and y indicate a varying stoichiometry.

4. The hardware-embedded security system of claim 3 wherein the first stoichiometry is a nitrogen poor stoichiometry and the second stoichiometry is a nitrogen rich stoichiometry.

5. The hardware-embedded security system of claim 4 wherein the variable conductivity layer includes the $Ta_yN_x$ layer and wherein the first stoichiometry includes at least one of $Ta_2N$ and TaN and the second stoichiometry includes $Ta_3N_5$.

6. The hardware-embedded security system of claim 1 wherein the plurality of connective components is selected from a plurality of gates, a plurality of interconnects and a plurality of conductive vias.

7. The hardware-embedded security system of claim 6 wherein the variable conductivity layer for the plurality of conductive components adjoins the plurality of circuit elements.

8. The hardware-embedded security system of claim 6 wherein each of the plurality of connective components further includes a high conductivity layer.

9. The hardware-embedded security system of claim 8 wherein the high conductivity layer includes at least one of Cu, Al, Co, W, Ru and a silicide.

10. The hardware-embedded security system of claim 8 wherein high conductivity layer includes a top, a bottom and a plurality of sides, the variable conductivity layer covering at least one of the top and the bottom.

11. The hardware-embedded security system of claim 10 wherein the variable conductivity layer covers the sides and the at least one of the top and the bottom.

12. The hardware-embedded security system of claim 8 wherein portions of the variable conductivity layer are interleaved with portions of the high conductivity layer.

13. The hardware-embedded security system of claim 12 wherein the portions of the variable conductivity layer are adjacent to the plurality of circuit elements and reside between the plurality of circuit elements and the portions of the high conductivity layer.

14. The hardware-embedded security system of claim 1 wherein the first portion and second portion of the plurality of connective components are configured to camouflage the first portion of the plurality of circuit elements that are active.

15. The hardware-embedded security system of claim 1 wherein the variable conductivity layer has a thickness of not more than five nanometers.

16. The hardware-embedded system of claim 15 wherein the thickness is at least one nanometer.

17. The hardware-embedded security system of claim 15 wherein the plurality of circuit elements includes at least one of a plurality of nonvolatile memory cells and a plurality of gates.

18. A hardware-embedded security system comprising:
a plurality of connective components including a variable conductivity layer, the variable conductivity layer being conductive for a first stoichiometry and being insulating for a second stoichiometry, the variable conductivity layer being conductive for a first portion of the plurality of connective components and being insulating for a second portion of the plurality of connective components, the first stoichiometry and the second stoichiometry including at least one of $Ta_yN_x$ layer, a $Ti_yN_x$ layer, a $W_yN_x$ layer, a $Hf_yN_x$ layer, a $Zr_yN_x$ layer and a $Mo_yN_x$, wherein x and y indicate a varying stoichiometry;
a plurality of circuit elements, the first portion of the plurality of connective components being connected to a first portion of the plurality of circuit elements, the second portion of the plurality of connective components being connected to a second portion of the plurality of circuit elements such that the first portion of the plurality of circuit elements are active and the second portion of the plurality of circuit elements are inactive, the plurality of circuit elements including at least one of a plurality of memory cells and a plurality of gates, the variable conductivity layer for the plurality of conductive components adjoining the plurality of circuit elements;
an insulator adjacent to at least a portion of each of the plurality of connective components, the first stoichiometry being indistinguishable from the second stoichiometry via optical imaging and electron imaging of a portion of the insulator and the variable conductivity layer.

19. A method for providing a hardware security system comprising:
a plurality of connective components including a variable conductivity layer, the variable conductivity layer being conductive for a first stoichiometry and being insulating for a second stoichiometry, the variable conductivity layer being conductive for a first portion of the plurality of connective components and being insulating for a second portion of the plurality of connective components, the first stoichiometry consisting of a plurality of elements, the second stoichiometry consisting of the plurality of elements;
providing a plurality of circuit elements, the first portion of the plurality of connective components being connected to a first portion of the plurality of circuit elements, the second portion of the plurality of connective components being connected to a second portion of the plurality of circuit elements such that the first portion of the plurality of circuit elements are active and the second portion of the plurality of circuit elements are inactive; and
providing an insulator adjacent to at least a portion of each of the plurality of connective components.

20. The method of claim 19 wherein the first stoichiometry is indistinguishable from the second stoichiometry via optical imaging and electron imaging of a portion of the insulator and the variable conductivity layer.

* * * * *